United States Patent
Matsuoka et al.

(10) Patent No.: US 9,722,458 B2
(45) Date of Patent: Aug. 1, 2017

(54) POWER CONVERSION DEVICE AND METHOD OF CONTROLLING THE SAME

(71) Applicant: TOSHIBA MITSUBISHI-ELECTRIC INDUSTRIAL SYSTEMS CORPORATION, Chuo-ku (JP)

(72) Inventors: Yuji Matsuoka, Chuo (JP); Tatsuaki Ambo, Chuo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/029,881

(22) PCT Filed: Oct. 15, 2013

(86) PCT No.: PCT/JP2013/078011
§ 371 (c)(1),
(2) Date: Apr. 15, 2016

(87) PCT Pub. No.: WO2015/056309
PCT Pub. Date: Apr. 23, 2015

(65) Prior Publication Data
US 2016/0233787 A1    Aug. 11, 2016

(51) Int. Cl.
*H02M 3/24* (2006.01)
*H02J 7/35* (2006.01)
(Continued)

(52) U.S. Cl.
CPC .......... *H02J 7/35* (2013.01); *H02M 3/33507* (2013.01); *H02J 3/1842* (2013.01); *H02J 3/28* (2013.01); *H02M 7/48* (2013.01); *Y02E 40/22* (2013.01)

(58) Field of Classification Search
CPC ... H02M 3/33507; H02M 7/53871; H02J 7/35
(Continued)

(56) References Cited

U.S. PATENT DOCUMENTS

| | | | | |
|---|---|---|---|---|
| 5,892,354 A | * | 4/1999 | Nagao ................ | G05F 1/67 323/299 |
| 2005/0116671 A1 | * | 6/2005 | Minami ................ | G05F 1/67 318/275 |

(Continued)

FOREIGN PATENT DOCUMENTS

| CN | 103038990 A | 4/2013 |
|---|---|---|
| JP | 62-200413 A | 9/1987 |

(Continued)

OTHER PUBLICATIONS

Combined Chinese Office Action and Search Report issued Nov. 28, 2016 in Chinese Patent Application No. 201380081235.1 (with partial English language translation and English translation of categories of cited documents).

(Continued)

*Primary Examiner* — Nguyen Tran
(74) *Attorney, Agent, or Firm* — Oblon, McClelland, Maier & Neustadt, L.L.P.

(57) ABSTRACT

A power conversion device includes a smoothing capacitor, an input voltage detection unit, a power conversion unit, and a controller. The input voltage detection unit detects a voltage value of the input voltage. The power conversion unit converts a direct-current voltage smoothed by the smoothing capacitor into an alternating-current voltage to output the alternating-current voltage to a power system. The controller has a first operation mode of outputting active power to the power system, has a second operation mode of outputting reactive power to the power system, determines whether or not the voltage value is one of equal to and higher than a determination value, and makes a transition from the first operation mode to the second operation mode within a predetermined time from a time point when it is determined that the voltage value is lower than the determination value.

7 Claims, 4 Drawing Sheets

(51) Int. Cl.
 *H02M 3/335* (2006.01)
 *H02J 3/18* (2006.01)
 *H02J 3/28* (2006.01)
 *H02M 7/48* (2007.01)

(58) Field of Classification Search
 USPC .............................. 323/906; 363/95, 97, 98
 See application file for complete search history.

(56) References Cited

U.S. PATENT DOCUMENTS

| | | | |
|---|---|---|---|
| 2009/0303763 A1* | 12/2009 | Yuguchi | ............... H02J 7/35 363/79 |
| 2011/0316480 A1 | 12/2011 | Mills-Price et al. | |
| 2013/0155738 A1 | 6/2013 | O'Brien et al. | |

FOREIGN PATENT DOCUMENTS

| | | |
|---|---|---|
| JP | 2009-169800 | 7/2009 |
| JP | 2011-193685 A | 9/2011 |

OTHER PUBLICATIONS

International Search Report issued on Jan. 21, 2014 for PCT/JP2013/078011 filed on Oct. 15, 2013.
European Extended Search Report issued May 22, 2017 in European Application No. 13895714.7.
Japanese Office Action issued in Japanese Patent Application No. 2015-542436 on Jun. 1, 2017 (w/ English translation).

* cited by examiner

POWER CONVERSION DEVICE AND METHOD OF CONTROLLING THE SAME

CROSS-REFERENCE TO RELATED APPLICATIONS

This is a National Stage application of International Application PCT/JP2013/078011, filed on Oct. 15, 2013; the entire contents of which are incorporated herein by reference.

FIELD

Embodiments described herein relate generally to a power conversion device and method of controlling the same.

BACKGROUND

There have been power conversion devices each for converting a direct-current voltage input from a direct-current power source such as a solar cell panel into an alternating-current voltage to output the alternating-current voltage to a power system. The power conversion devices are each called, for example, a power conditioner. Further, some of the power conversion devices perform a reactive power compensation when the input voltage from the direct-current power source is low. In the case in which, for example, the solar cell panel is used as the direct-current power source, some of the power conversion devices perform the reactive power compensation during the night low in electricity production. In such power conversion devices, there is desired a reduction in initial charging circuit.

DETAILED DESCRIPTION

According to one embodiment, a power conversion device includes a smoothing capacitor, an input voltage detection unit, a power conversion unit, and a controller. The smoothing capacitor is adapted to smooth a direct-current input voltage input from a direct-current power source. The input voltage detection unit is adapted to detect a voltage value of the input voltage. The power conversion unit is adapted to convert a direct-current voltage smoothed by the smoothing capacitor into an alternating-current voltage to output the alternating-current voltage to a power system. The controller is adapted to control a conversion in the power conversion unit. The controller has a first operation mode of outputting active power to the power system when the voltage value detected by the input voltage detection unit is one of equal to and higher than a determination value, has a second operation mode of outputting reactive power to the power system when the voltage value is lower than the determination value, determines whether or not the voltage value is one of equal to and higher than the determination value, and makes a transition from the first operation mode to the second operation mode within a predetermined time from a time point when it is determined that the voltage value is lower than the determination value.

According to another embodiment, a method is disclosed for controlling a power conversion device including a smoothing capacitor adapted to smooth a direct-current input voltage input from a direct-current power source, an input voltage detection unit adapted to detect a voltage value of the input voltage, a power conversion unit adapted to convert a direct-current voltage smoothed by the smoothing capacitor into an alternating-current voltage to output the alternating-current voltage to a power system, and a controller adapted to control a conversion in the power conversion unit, the controller having a first operation mode of outputting active power to the power system when the voltage value detected by the input voltage detection unit is one of equal to and higher than a determination value, a second operation mode of outputting reactive power to the power system when the voltage value is lower than the determination value. The method can include determining whether or not the voltage value of the input voltage is one of equal to and higher than the determination value. The method can include making the controller make a transition from the first operation mode to the second operation mode within a predetermined time from a time point when it is determined that the voltage value is lower than the determination value.

Various embodiments will be described hereinafter with reference to the accompanying drawings. The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

(First Embodiment)

Figure 1:
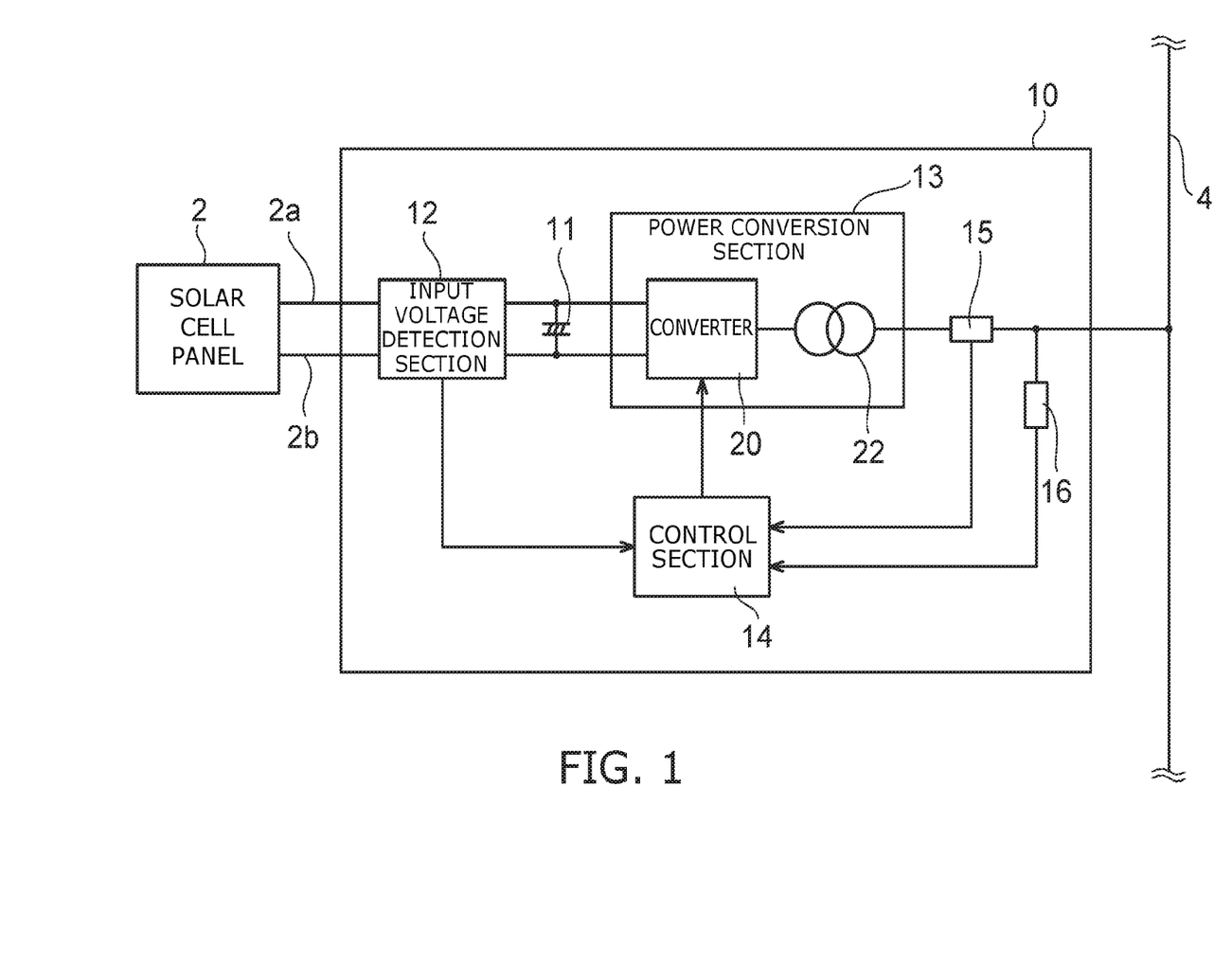
FIG. 1 is a block diagram schematically showing a power conversion device according to a first embodiment.

FIG. 1 is a block diagram schematically showing a power conversion device according to a first embodiment. As shown in FIG. 1, the power conversion device 10 is provided with a smoothing capacitor 11, an input voltage detection unit 12, a power conversion unit 13, and a controller 14.

The power conversion device 10 is electrically connected to each of a solar cell panel 2 as a direct-current power source, and a power system 4. The power conversion device 10 is detachably connected to each of the solar cell panel 2 and the power system 4 with, for example, connectors. It should be noted that in the specification, "electrically connecting" includes the case in which the power conversion device 10 is connected via another conductive member in addition to the case in which the power conversion device 10 is connected with a direct contact.

The power conversion device 10 is electrically connected to the solar cell panel 2 via, for example, a pair of power input lines 2a, 2b. Thus, to the power conversion device 10, there is input direct-current power generated by the solar cell panel 2. It should be noted that the direct-current power source to be connected to the power conversion device 10 is not limited to the solar cell panel 2, but can also be, for example, a gas turbine engine. The direct-current source can be an arbitrary power source capable of supplying the direct-current power.

The power system 4 is, for example, a power transmission line for supplying a customer power incoming installation with electricity. The electricity supplied by the power system 4 is alternating-current power. The power system 4 is, for example, a power transmission line for the commercial power. The voltage of the alternating-current power of the power system 4 is, for example, 100 V (effective value), and the frequency of the alternating-current power of the power system 4 is, for example, 50 Hz or 60 Hz. The power system 4 can be, for example, a power transmission line in an off-grid power system.

The smoothing capacitor 11 is connected in series between, for example, a pair of power input lines 2a, 2b. Thus, the smoothing capacitor 11 smoothes a direct-current input voltage input from the solar cell panel 2. The smoothing capacitor 11 is charged by, for example, the input voltage from the solar cell panel 2.

The input voltage detection unit 12 detects the voltage value of the input voltage from the solar cell panel 2. The input voltage detection unit 12 is electrically connected to the controller 14. The input voltage detection unit 12 inputs the voltage value of the input voltage thus detected to the controller 14.

In the example, the input voltage detection unit 12 is connected between the solar cell panel 2 and the smoothing capacitor 11. The input voltage detection unit 12 is can be connected between, for example, the smoothing capacitor 11 and the power conversion unit 13 besides the configuration described above. The input voltage detection unit 12 can have an arbitrary configuration capable of detecting the input voltage.

The power conversion unit 13 converts the direct-current voltage having been smoothed by the smoothing capacitor 11 into an alternating-current voltage to output the alternating-current voltage to the power system 4. The power conversion unit 13 includes, for example, a converter 20 and a transformer 22. The converter 20 converts the direct-current voltage into the alternating-current voltage to output the alternating-current voltage to the transformer 22. The transformer 22 transforms, for example, the alternating-current voltage output from the converter 20 to output the alternating-current voltage, which has been transformed, to the power system 4.

As the converter 20, there is used, for example, a self-excited converter. The converter 20 includes, for example, a switching element to convert the direct-current voltage into the alternating-current voltage by turning ON/OFF the switching element. As the switching element of the converter 20, there is used, for example, a self-arc-extinguishing element. More specifically, there is used, for example, a GTO (Gate Turn-Off thyristor), a MOS-FET (Metal-Oxide-Semiconductor Field-Effect Transistor), or an IGBT (Insulated Gate Bipolar Transistor).

In the example, the power conversion device 10 is further provided with an output current detection unit 15 and a system voltage detection unit 16.

The output current detection unit 15 detects the current value of the output current output from the power conversion unit 13. The output current detection unit 15 is electrically connected to the controller 14. The output current detection unit 15 inputs the current value of the output current thus detected to the controller 14.

The system voltage detection unit 16 detects the voltage value of the system voltage of the power system 4. The system voltage detection unit 16 is electrically connected to the controller 14. The system voltage detection unit 16 inputs the voltage value of the system voltage thus detected to the controller 14.

The controller 14 is a processor such as a CPU or an MPU. The controller 14 retrieves a predetermined program from a memory not shown in the drawings, and by sequentially processing the program, the units of the power conversion device 10 are integrally controlled. The memory storing the program can be provided in the controller 14, or can also be provided separately from the controller 14, and electrically be connected to the controller 14.

The controller 14 is electrically connected to the power conversion unit 13. The controller 14 controls the conversion of the power by the power conversion unit 13. The controller 14 is electrically connected to, for example, the switching element of the converter 20. The controller 14 controls, for example, turning ON/OFF of the switching element. Thus, the controller 14 converts, for example, the direct-current voltage into the alternating-current voltage having the voltage and the frequency corresponding to the power system 4.

Further, the controller 14 has a first operation mode and a second operation mode. The first operation mode is a mode for outputting active power to the power system 4 when the voltage value having been detected by the input voltage detection unit 12 is equal to or higher than a determination value. The first operation mode is, for example, a PV (Photovoltaic) operation mode. The second operation mode is a mode for outputting reactive power to the power system 4 when the voltage value is lower than the determination value. The second operation mode is, for example, an SVC (Static Var Compensator) operation mode.

The controller 14 determines whether or not the voltage value of the input voltage having been detected by the input voltage detection unit 12 is equal to or higher than the determination value set in advance. Then, the controller 14 performs the first operation mode in the case in which the voltage value of the input voltage is equal to or higher than the determination value, and performs the second operation mode in the case in which the voltage value is lower than the determination value. The controller 14 periodically performs the determination on, for example, whether or not the input voltage is equal to or higher than the determination value. Alternatively, it is also possible to substantially continuously refer to the voltage value of the input voltage input from the input voltage detection unit 12.

The determination value is determined in accordance with, for example, the electricity production of the solar cell panel 2. Specifically, the controller 14 performs the first operation mode of outputting the active power to the power system 4 when the sufficient electricity production is obtained, and performs the second operation mode of outputting the reactive power to the power system 4 when the sufficient electricity production is not obtained. In more detail, the controller 14 performs the first operation mode when the electricity production is high such as the daytime on a clear day, and performs the second operation mode when the electricity production is low such as a cloudy day or the nighttime.

It should be noted that it is assumed that "outputting the power to the power system 4" includes the case of supplying the power to a system load (e.g., electronic equipment) via a switchboard or a distribution board in addition to a so-called reverse power flow of supplying the power transmission line or the like with the power.

In the first operation mode, the controller 14 performs the ON/OFF control on the switching element of the converter 20 so as to perform the conversion into, for example, the alternating-current power synchronized with the alternating-current power of the power system 4. Specifically, the controller 14 makes the voltage, the frequency, the phase, and so on of the alternating-current power converted by the converter 20, for example, coincide with those of the alternating-current power of the power system 4. Thus, the alternating-current power having been converted by the converter 20 is output to the power system 4 as the active power.

In the second operation mode, the controller 14 determines the reactive power to be output to the power system 4 based on, for example, the current value of the output current detected by the output current detection unit 15 and the voltage value of the system voltage detected by the system voltage detection unit 16. Then, the controller 14 performs the ON/OFF control on the switching element of the converter 20 in accordance with the reactive power thus determined. Thus, the alternating-current power having been converted by the converter 20 is output to the power system 4 as the reactive power. Thus, the reactive power of the power system 4, for example, can be controlled. For example, the stability of the power system 4 can be improved.

In the second operation mode, the direct-current voltage of the smoothing capacitor 11 is converted into the alternating-current voltage by the converter 20. On this occasion, by turning ON/OFF the switching element of the converter 20, the smoothing capacitor 11 is charged. Therefore, the voltage value of the smoothing capacitor 11 is kept at the level equal to or higher than a predetermined value also in the second operation mode.

In the case in which the controller 14 determines that the voltage value of the input voltage is lower than the determination value, the controller 14 makes the transition from the first operation mode to the second operation mode within a predetermined time from a time point when the controller 14 determines that the voltage of the input voltage is lower than the determination value.

In response to, for example, the determination that the voltage value of the input voltage is lower than the determination value, the controller 14 stops the first operation mode. In other words, the output of the active power to the power system 4 is stopped. The controller 14 starts measuring time at the time point when, for example, it has been determined that the voltage value of the input voltage is lower than the determination value, and starts the second operation mode at the time point when a predetermined time has elapsed from the time point when it has been determined that the voltage value of the input voltage is lower than the determination value. In other words, the output of the reactive power to the power system 4 is started.

As described above, at the time point when the predetermined time has elapsed from the time point when it has been determined that the voltage value of the input voltage is lower than the determination value, the controller 14 makes the transition from the first operation mode to the second operation mode. Further, at the time point when, for example, the controller 14 has determined that the voltage value of the input voltage is lower than the determination value, the controller 14 stops the first operation mode. In other words, in the period from the time point when the first operation mode is stopped to when the second operation mode is started, the operation mode is different from each of the first operation mode and the second operation mode. In the case in which, for example, the voltage value of the input voltage has been restored to a level equal to or higher than the determination value before the predetermined time elapses, the controller 14 performs the first operation mode once again.

The predetermined time for making the transition from the first operation mode to the second operation mode is set in accordance with, for example, the capacitance of the smoothing capacitor 11 and the configuration of the power conversion unit 13. The controller 14 makes the transition from the first operation mode to the second operation mode before, for example, the voltage (the charge accumulated) of the smoothing capacitor 11 becomes lower than a predetermined value. In other words, it can be said that the controller 14 determines whether or not the voltage value of the input voltage is equal to or higher than a first determination value, and in the case in which it is determined that the voltage value is lower than the first determination value, the controller 14 makes the transition from the first operation mode to the second operation mode at the time point when the voltage value (the voltage value of the smoothing capacitor 11) of the input voltage has reached a second determination value lower than the first determination value.

It should be noted that it is also possible to make the transition from the first operation mode to the second operation mode continuously at the time point when a predetermined time has elapsed without stopping the first operation mode at the time point when it is determined that the voltage value of the input voltage is lower than the determination value. It should be noted that as described above, the first operation mode is stopped at the time point when it has been determined that the voltage value of the input voltage is lower than the determination value. Thus, the consumption of the charge stored in the smoothing capacitor 11 can be suppressed in a period, for example, until the predetermined time elapses.

Then, an operation of the power conversion device 10 will be described.

Figure 2:
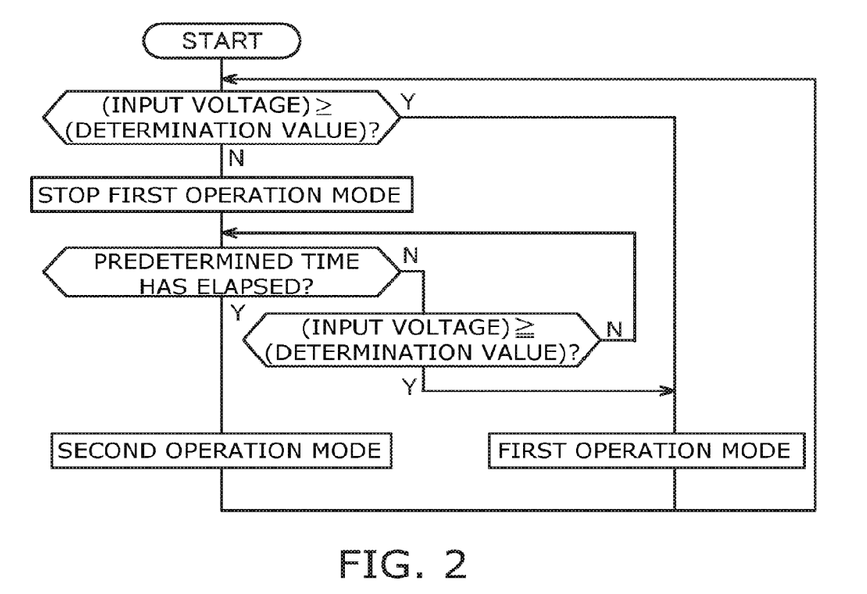
FIG. 2 is a flowchart schematically showing an example of the operation of the power conversion device according to the first embodiment.

FIG. 2 is a flowchart schematically showing an example of the operation of the power conversion device according to the first embodiment.

As shown in FIG. 2, the controller 14 of the power conversion device 10 periodically, or substantially continuously determines whether or not the voltage value of the input voltage is equal to or higher than the determination value during the first operation mode.

In the case in which it has been determined that the voltage value is equal to or higher than the determination value, the controller 14 continues the first operation mode. In contrast, in the case in which it has been determined that the voltage value is lower than the determination value, the controller 14 stops the first operation mode, and then starts measuring the predetermined time.

In the case in which the predetermined time has elapsed in the state in which the voltage value of the input voltage is lower than the determination value, the controller 14 starts performing the second operation mode at the time point when the time has elapsed. On the other hand, in the case in which the voltage value of the input voltage has restored to a level equal to or higher than the determination value after the measurement of the predetermined time has been started, the controller 14 performs the first operation mode once again. Further, in the case in which the voltage value of the input voltage becomes equal to or higher than the determination value during the execution of the second operation mode, the controller 14 makes the transition from the second operation mode to the first operation mode. Thereafter, the controller 14 repeats substantially the same process.

For example, in the power conversion devices including the PV operation mode and the SVC operation mode, some devices perform the SVC operation when a predetermined time or more has elapsed after stopping the PV operation. In this case, since the voltage of the capacitor drops, there becomes necessary an initial charging circuit for charging the capacitor before starting the SVC operation.

In contrast, in the power conversion device 10 according to the embodiment, there is made the transition from the first operation mode to the second operation mode within the predetermined time from the time point when it has been determined that the voltage value of the input voltage is lower than the determination value. Therefore, the transition from the first operation mode to the second operation mode is made before the voltage of the smoothing capacitor 11 becomes lower than the predetermined value. Thus, in the power conversion device 10 according to the embodiment, the initial charging circuit can be eliminated. In the power conversion device 10, the number of components can be reduced. For example, the manufacturing cost of the power conversion device 10 can be suppressed.

Further, in the power conversion device 10 according to the embodiment, there is made the transition to the second operation mode after the predetermined time has elapsed from the time point when it has been determined that the voltage value of the input voltage is lower than the determination value.

Thus, in the case in which, for example, the electricity production increases and decreases around the determination value due to a cloud condition, the controller 14 is inhibited from being switched between the first operation mode and the second operation mode a number of times with a short period.

Figure 3:
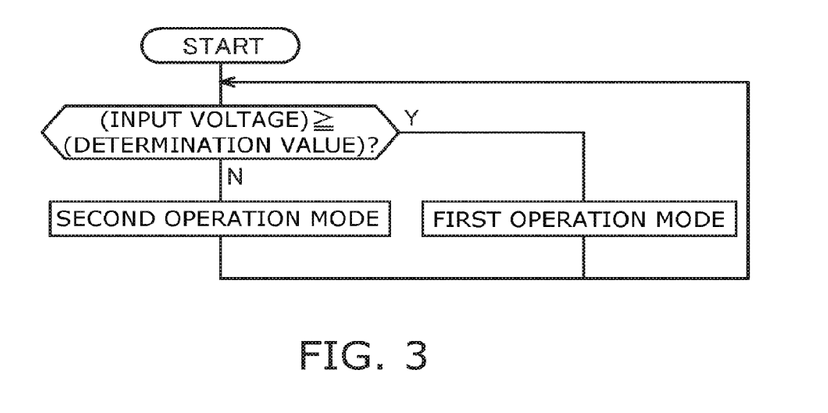
FIG. 3 is a flowchart schematically showing an example of another operation of the power conversion device according to the first embodiment.

FIG. 3 is a flowchart schematically showing an example of another operation of the power conversion device according to the first embodiment.

As shown in FIG. 3, in the example, during the period in which the controller 14 is in the first operation mode, the controller 14 periodically or substantially continuously determines whether or not the voltage value of the input voltage is equal to or higher than the determination value, and in the case in which the controller 14 has determined that the voltage value is lower than the determination value, the controller 14 makes the transition from the first operation mode to the second operation mode continuously at the time point of the determination.

As described above, it is also possible to make the controller 14 make the transition from the first operation mode to the second operation mode immediately at the time point when it has been determined that the voltage value is lower than the determination value without sparing a predetermined time. In this case, for example, the voltage of the smoothing capacitor 11 can more appropriately inhibit from dropping. It is also possible to provide, for example, a mode of making the transition to the second operation mode after a predetermined time elapses, and a mode of immediately making the transition to the second operation mode to allow the user to arbitrarily select either of the modes.

As described above, it is sufficient for the method of controlling the power conversion device 10 to include a process of determining whether or not the voltage value of the input voltage is equal to or higher than the determination value, and a process of making the controller 14 make the transition from the first operation mode to the second operation mode within the predetermined time from the time point when it has been determined that the voltage value is lower than the determination value.

(Second Embodiment)

Figure 4:
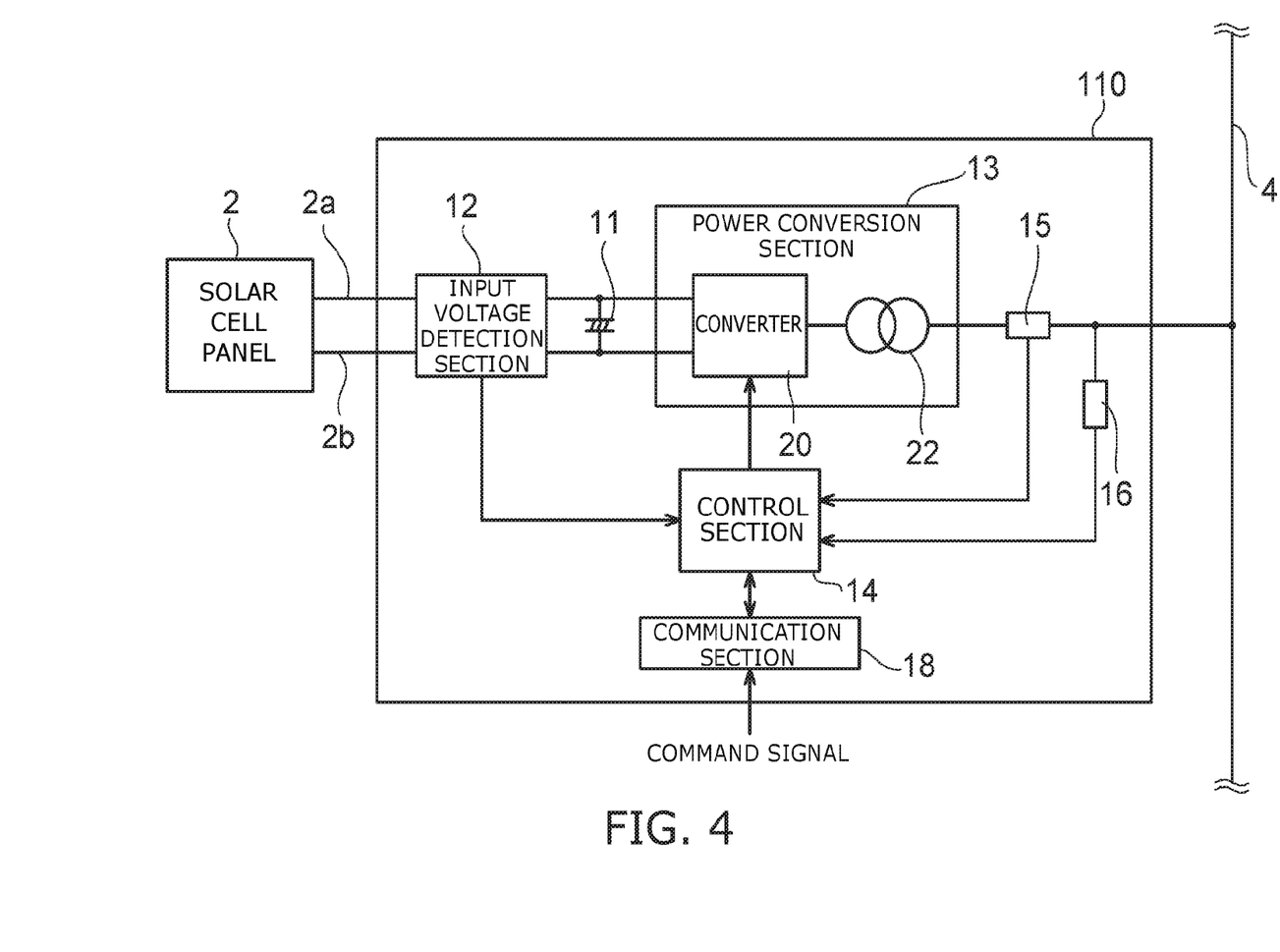
FIG. 4 is a block diagram schematically showing a power conversion device according to a second embodiment.

FIG. 4 is a block diagram schematically showing a power conversion device according to a second embodiment.

As shown in FIG. 4, the power conversion device 110 is further provided with a communication unit 18. It should be noted that in the power conversion device 110, those the same in function/configuration as in the first embodiment described above are denoted by the same reference symbols, and detailed description thereof will be omitted.

The communication unit 18 performs communication with an external device of the power conversion device 110. The communication unit 18 performs the communication with, for example, a controller for controlling the power of the power system 4. The communication unit 18 is electrically connected to the controller 14. The communication unit 18 performs the communication with the external device in accordance with, for example, an instruction from the controller 14 to receive a command signal from the external device. Then, the communication unit 18 inputs the command signal thus received to the controller 14. The command signal includes, for example, information of the system voltage of the power system 4. The communication unit 18 is, for example, a modem or a router. The communication type of the communication unit 18 can be a wired type or a wireless type.

Figure 5:
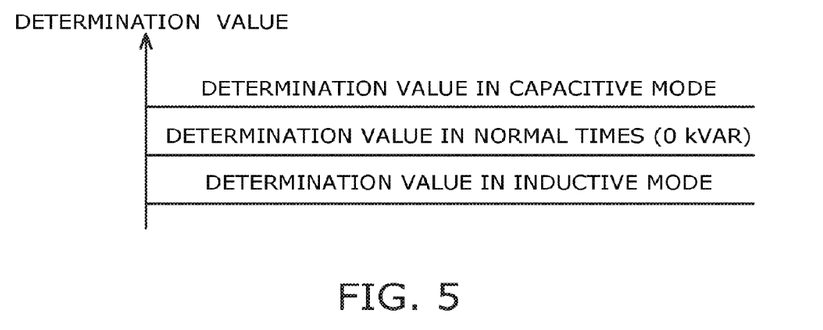
FIG. 5 is a schematic diagram showing an example of an operation of the power conversion device according to the second embodiment.

FIG. 5 is a schematic diagram showing an example of an operation of the power conversion device according to the second embodiment.

As shown in FIG. 5, the controller 14 varies the determination value of the input voltage in accordance with the command signal input from the outside.

The controller 14 sets the determination value higher than in the normal times in the case of, for example, a capacitive mode (a reactive power supply mode) in which the inflowing current to the power conversion device 110 is in a phase-leading state. In other words, the controller 14 sets the determination value higher than in the normal times in the case of a mode of raising the system voltage.

Further, the controller 14 sets the determination value lower than in the normal times in the case of, for example, an inductive mode (a reactive power consumption mode) in which the inflowing current to the power conversion device 110 is in a phase-lagging state. In other words, the controller 14 sets the determination value lower than in the normal times in the case of a mode of dropping the system voltage.

In this case, the command signal includes, for example, a phase difference between the voltage and the current of the power system 4. The controller 14 determines whether the mode is the capacitive mode or the inductive mode based on, for example, the information of the phase difference included in the command signal, and then sets the determination value in accordance with the result. It should be noted that, for example, the determination value itself can be included in the command signal.

In the case in which, for example, the determination value is constant as in the case of the power conversion device 10 according to the first embodiment, it is necessary to set the determination value used in the capacitive mode. In other words, it is necessary to set the highest determination value.

In contrast, in the power conversion device 110 according to the embodiment, it is possible to set, for example, the lower determination value in the normal times and the inductive mode than in the capacitive mode. Therefore, it is possible to operate the device in the first operation mode to a lower input voltage. For example, the utilization rate of the first operation mode can be increased. For example, the time making a contribution to the power generation can be made longer.

It should be noted that in the power conversion device 110 receiving a command signal from the external device, for example, it is also possible to make the controller 14 make the transition from the first operation mode to the second operation mode in accordance with the command from the external device irrespective of the voltage value of the input voltage. It is also possible to make the power conversion device 110 make the transition from the first operation mode to the second operation mode in accordance with the command signal when, for example, the fluctuation range of the system voltage is large.

Further, when, for example, making a plurality of power conversion devices 110 operate in conjunction with each other, it is possible to arrange that the reactive power caused by the operations of the power conversion devices 110 can be controlled by making at least one of the power conversion devices 110 operate in the second operation mode and making the rest of the power conversion devices 110 operate in the first operation mode in accordance with the command signal.

According to the embodiments, a power conversion device in which an initial charging circuit can be reduced, and a method for controlling the power conversion device are provided.

Hereinabove, embodiments of the invention are described with reference to specific examples. However, the embodiments of the invention are not limited to these specific examples. For example, one skilled in the art may similarly practice the invention by appropriately selecting specific configurations of components included in power conversion devices such as smoothing capacitors, input voltage detection units, power conversion units, controllers, output current detection units, and system voltage detection units etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all power conversion devices and methods for controlling power conversion device practicable by an appropriate design modification by one skilled in the art based on the power conversion devices and the methods for controlling power conversion device described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A power conversion device comprising:
a smoothing capacitor adapted to smooth a direct-current input voltage input from a direct-current power source;
an input voltage detection unit adapted to detect a voltage value of the input voltage;
a power conversion unit adapted to convert a direct-current voltage smoothed by the smoothing capacitor into an alternating-current voltage to output the alternating-current voltage to a power system; and
a controller adapted to control a conversion in the power conversion unit,
the controller having a first operation mode of outputting active power to the power system when the voltage value detected by the input voltage detection unit is one of equal to and higher than a determination value, having a second operation mode of outputting reactive power to the power system when the voltage value is lower than the determination value, determining whether or not the voltage value is one of equal to and higher than the determination value, and making a transition from the first operation mode to the second operation mode within a predetermined time from a time point when it is determined that the voltage value is lower than the determination value.

2. The device according to claim 1, wherein
the controller varies the determination value in accordance with a command signal input from an outside.

3. The device according to claim 1, further comprising:
an output current detection unit adapted to detect a current value of an output current output from the power conversion unit; and
a system voltage detection unit adapted to detect a voltage value of a system voltage of the power system,
the controller determining the reactive power to be output to the power system based on the current value of the output current detected by the output current detection unit and the voltage value of the system voltage detected by the system voltage detection unit in the second operation mode.

4. The device according to claim 1, wherein
the controller makes the transition from the first operation mode to the second operation mode at the time point when the predetermined time has elapsed from the time point when it has been determined that the voltage value of the input voltage is lower than the determination value.

5. The device according to claim 1, wherein
the controller makes the transition from the first operation mode to the second operation mode continuously when it is determined that the voltage value is lower than the determination value.

6. The device according to claim 1, wherein
the direct-current power source is a solar cell panel.

7. A method for controlling a power conversion device including a smoothing capacitor adapted to smooth a direct-current input voltage input from a direct-current power source, an input voltage detection unit adapted to detect a voltage value of the input voltage, a power conversion unit adapted to convert a direct-current voltage smoothed by the smoothing capacitor into an alternating-current voltage to output the alternating-current voltage to a power system, and a controller adapted to control a conversion in the power conversion unit, the controller having a first operation mode of outputting active power to the power system when the voltage value detected by the input voltage detection unit is one of equal to and higher than a determination value, a second operation mode of outputting reactive power to the power system when the voltage value is lower than the determination value, comprising:
- determining whether or not the voltage value of the input voltage is one of equal to and higher than the determination value; and
- making the controller make a transition from the first operation mode to the second operation mode within a predetermined time from a time point when it is determined that the voltage value is lower than the determination value.

* * * * *